United States Patent [19]
Hadley et al.

[11] Patent Number: 5,406,126
[45] Date of Patent: Apr. 11, 1995

[54] HYBRID DRIVE SYSTEM WITH REGENERATION FOR MOTOR VEHICLES AND THE LIKE

[75] Inventors: John W. B. Hadley, Huntington; Qianyi Jiang, Jackson Heights, both of N.Y.

[73] Assignee: Lauzun Corporation, Huntington, N.Y.

[21] Appl. No.: 818,449

[22] Filed: Dec. 30, 1991

Related U.S. Application Data

[63] Continuation of Ser. No. 651,712, Feb. 6, 1991, abandoned.

[51] Int. Cl.$^6$ ............ B60L 11/00; H02P 9/00
[52] U.S. Cl. .................. 290/45; 290/14; 290/16
[58] Field of Search ............ 290/14, 16, 17, 45

[56] References Cited

U.S. PATENT DOCUMENTS

| | | | |
|---|---|---|---|
| 3,566,717 | 3/1971 | Berman et al. | 290/14 |
| 3,650,345 | 3/1972 | Yardney | 290/16 |
| 3,888,325 | 6/1975 | Reinbeck | 290/16 |
| 4,042,056 | 8/1977 | Horwinski | 290/16 |
| 4,099,589 | 7/1978 | Williams | 290/45 |
| 4,292,531 | 9/1981 | Williamson | 290/14 |
| 4,305,254 | 12/1981 | Kawakatsu et al. | 290/45 |
| 4,306,156 | 12/1981 | Monaco et al. | 290/17 |
| 4,438,342 | 3/1984 | Kenyon | 290/45 |
| 4,547,678 | 10/1985 | Metzner et al. | 290/45 |

OTHER PUBLICATIONS

Pepco (Potamac Electric Power Co), Plug into the Future, 1992.

*Primary Examiner*—A. D. Pellinen
*Assistant Examiner*—Robert Lloyd Hoover
*Attorney, Agent, or Firm*—Kane, Dalsimer, Sullivan, Kurucz, Levy, Eisele & Richard

[57] ABSTRACT

A hybrid motor vehicle includes a storage battery providing motive power to an electric motor under the control of a microprocessor. A generator with an internal combustion engine may be used to charge the storage battery. The motor is operated either in an actuated mode in which current flows from the battery and a dynamic braking mode in which regenerated current flows from the motor to the battery. Electronic circuitry is used to insure that regenerative current is generated even if the motor $Emf$ is lower than the voltage of the storage battery.

22 Claims, 17 Drawing Sheets

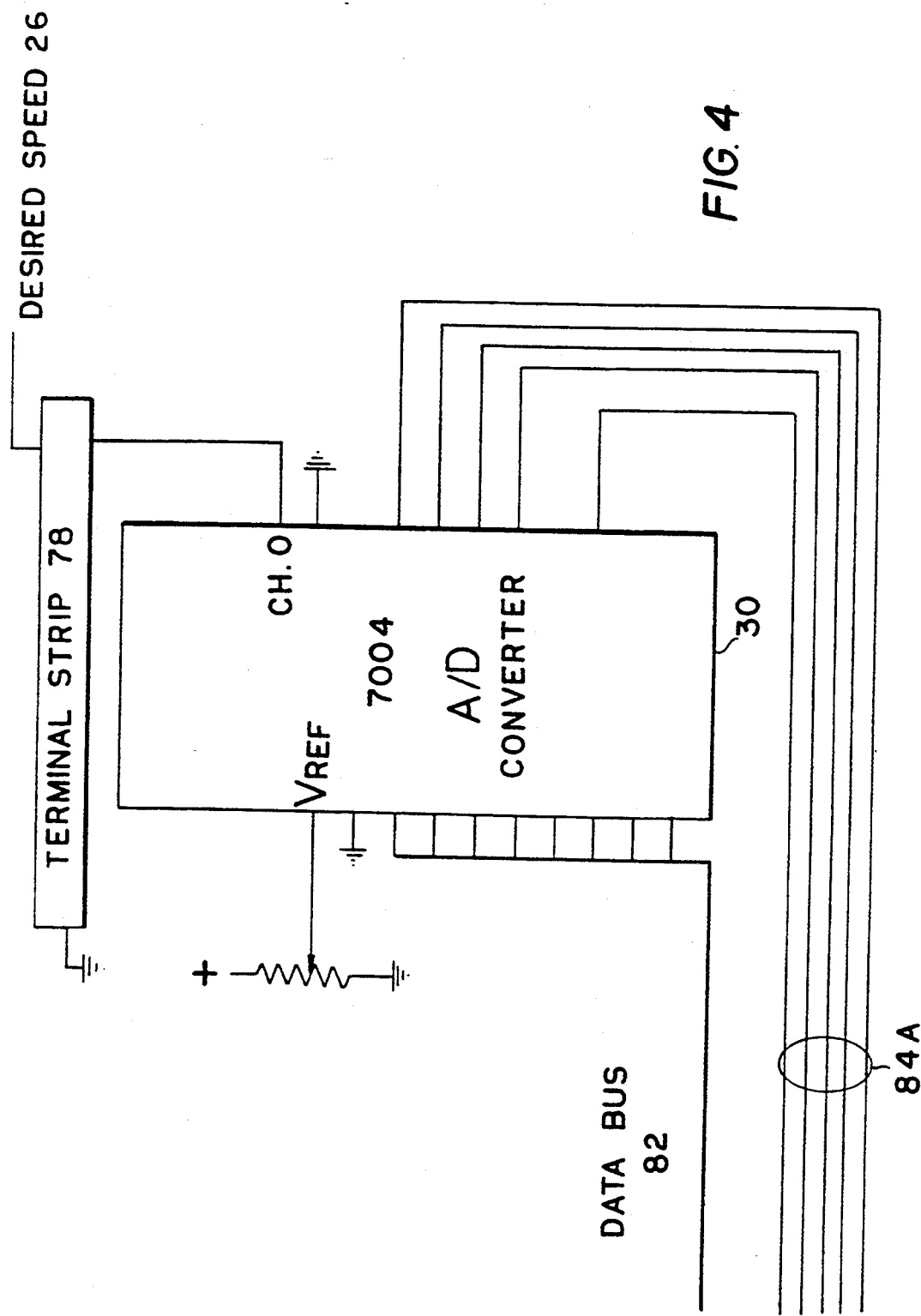

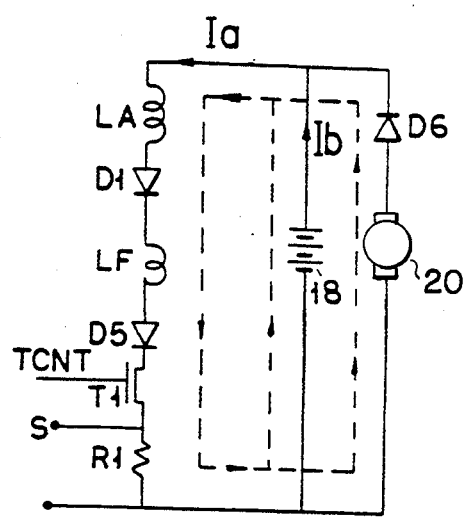
FIG. 13
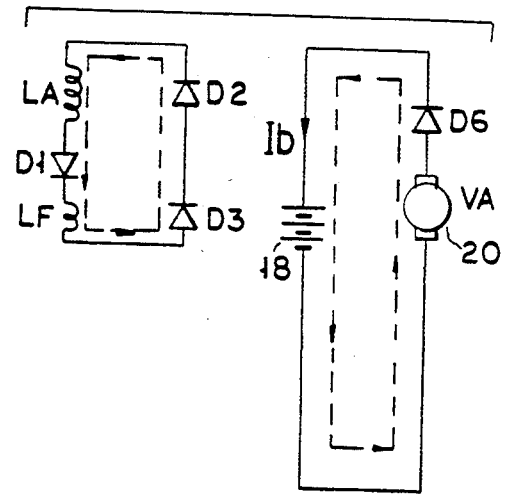
FIG. 14
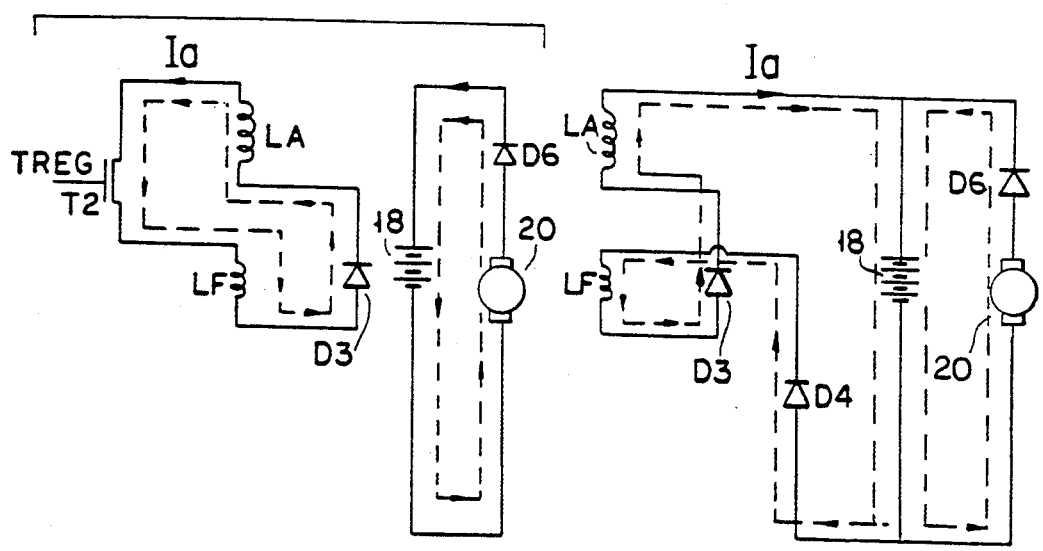
FIG. 15
FIG. 16

HYBRID DRIVE SYSTEM WITH REGENERATION FOR MOTOR VEHICLES AND THE LIKE

This is a continuation of application Ser. No. 07/651,712, filed on Feb. 6, 1991, now abandoned.

BACKGROUND OF THE INVENTION a. Field of Invention

This invention pertains to a hybrid power drive system for motor vehicles including an electric motor as the primary mover, a battery and a generator for deriving electric power for the motor. These components are arranged to provide dynamic braking.

b. Description of the Prior Art

Today the overwhelming majority of motor vehicles on the road rely on internal combustion engines as the primary mover. However, because of numerous environmental and economic factors, these types of motor vehicles are becoming more and more unacceptable. All electric motor vehicles using storage batteries as the only power source are environmentally and economically more acceptable. Nonetheless, despite extensive experimentation in this area, no such vehicles were developed which could provide the acceleration or the operating range that is provided by vehicles with internal combustion. As an intermediate solution, hybrid motor vehicles have been suggested with drive systems consisting of an electric motor which is used as a prime mover, a storage battery, and a generator for charging the battery, and to augment the battery. Systems of this type are disclosed in U.S. Pat. Nos. 4,292,531; 4,438,342; 4,547,678; 3,888,325; 4,042,056; 4,099,589. However, none of these proposed systems are acceptable because they rely on complicated circuitry and are not capable of performing the required switching of power between various modes in a satisfactory manner.

OBJECTIVES AND SUMMARY OF THE INVENTION

In view of the above-mentioned disadvantages of the prior art, it is an objective of the present invention to provide a power drive system for a hybrid motor vehicle wherein current from a battery and/or alternator is efficiently switched to optimize the performance of the motor vehicle.

A further objective is to provide a vehicle with a drive system including dynamic braking whereby a part of the kinetic energy of the vehicle is converted into electrical energy and stored into the batteries.

Yet another objective is to provide a system wherein the current for driving a motor is fed substantially from the battery, and wherein the battery is recharged while the vehicle is coasting.

Other objectives and advantages of the invention shall become apparent from the following description of the invention.

Briefly, a hybrid vehicle constructed in accordance with this invention includes a motor coupled to the wheels of the vehicle for providing the primary motive power, and battery/generator arrangement for providing current to the motor. A computer-controlled electronic circuit operates two switching transistors so that in response to an acceleration request, power is periodically fed to the motor from the battery and the generator. In between the power surges to the motor, the generator feeds current to the battery for recharging. The system can be idealized so that the amount of energy discharged from the battery is subsequently replaced from the generators. When the system is put into a braking mode, the motor selectively acts as a dynamic brake to generate electric power. Periodically, the motor is switched to an idle mode to permit the electric power generated by the motor to augment the charging current from the generator.

BRIEF DESCRIPTION OF THE DRAWINGS

FIG. 4 shows the analog/digital converter of FIG. 2;

FIG. 13 shows an equivalent circuit for the system with the vehicle in the accelerating mode and with power applied to the motor;

FIG. 14 shows an equivalent circuit for the system with the vehicle in the accelerating mode and with the battery being recharged;

FIG. 15 shows a first equivalent circuit for the system with the vehicle in the braking mode;

FIG. 16 shows a second equivalent circuit for the system with the vehicle in the braking mode;

DETAILED DESCRIPTION OF THE INVENTION

Figure 1:
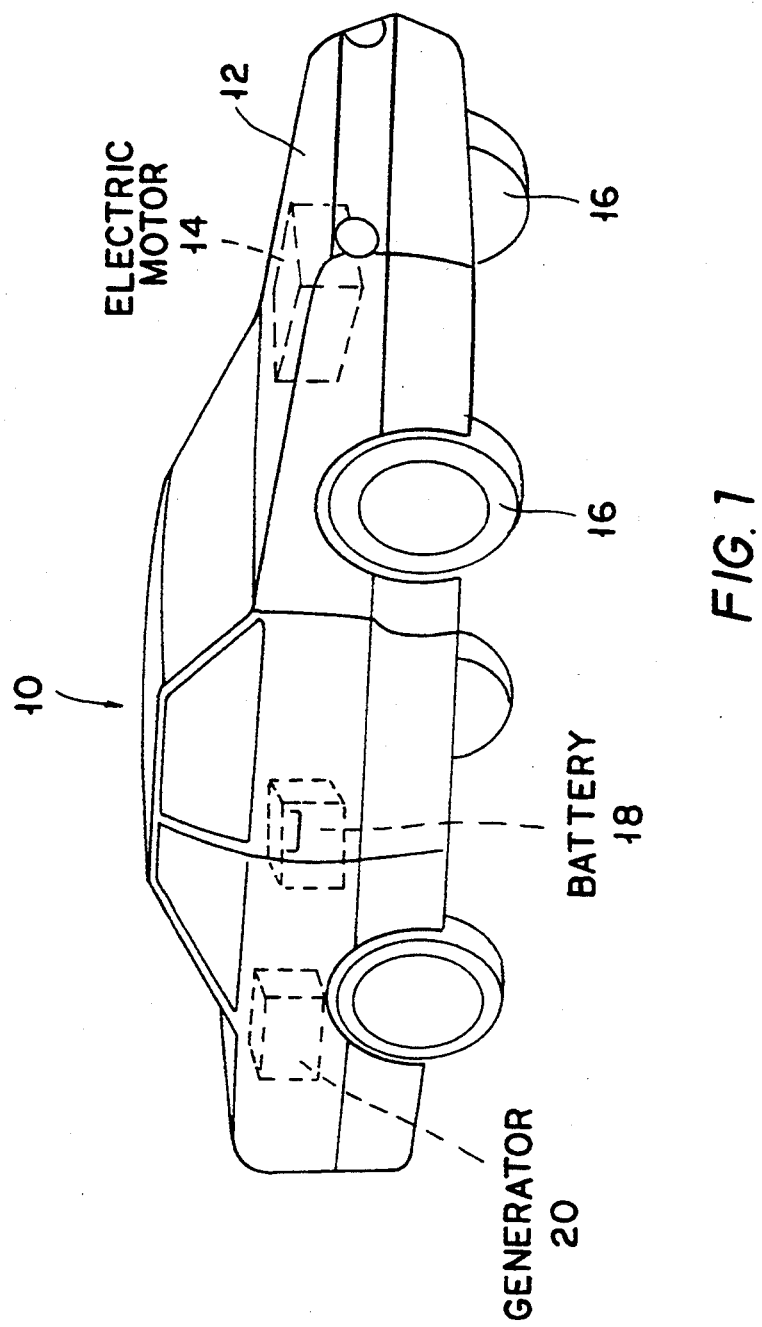
FIG. 1 shows a motor vehicle with a drive system constructed in accordance with this invention.

Referring now to the drawings, FIG. 1 shows a motor vehicle 10 including an engine compartment 12. Within this compartment there is an electric motor 14 which is coupled to the wheels 16 of the motor vehicle 10. The power for the electric motor 14 is derived from a storage battery 18, and a generator 20 as described more fully below.

Figure 2A:
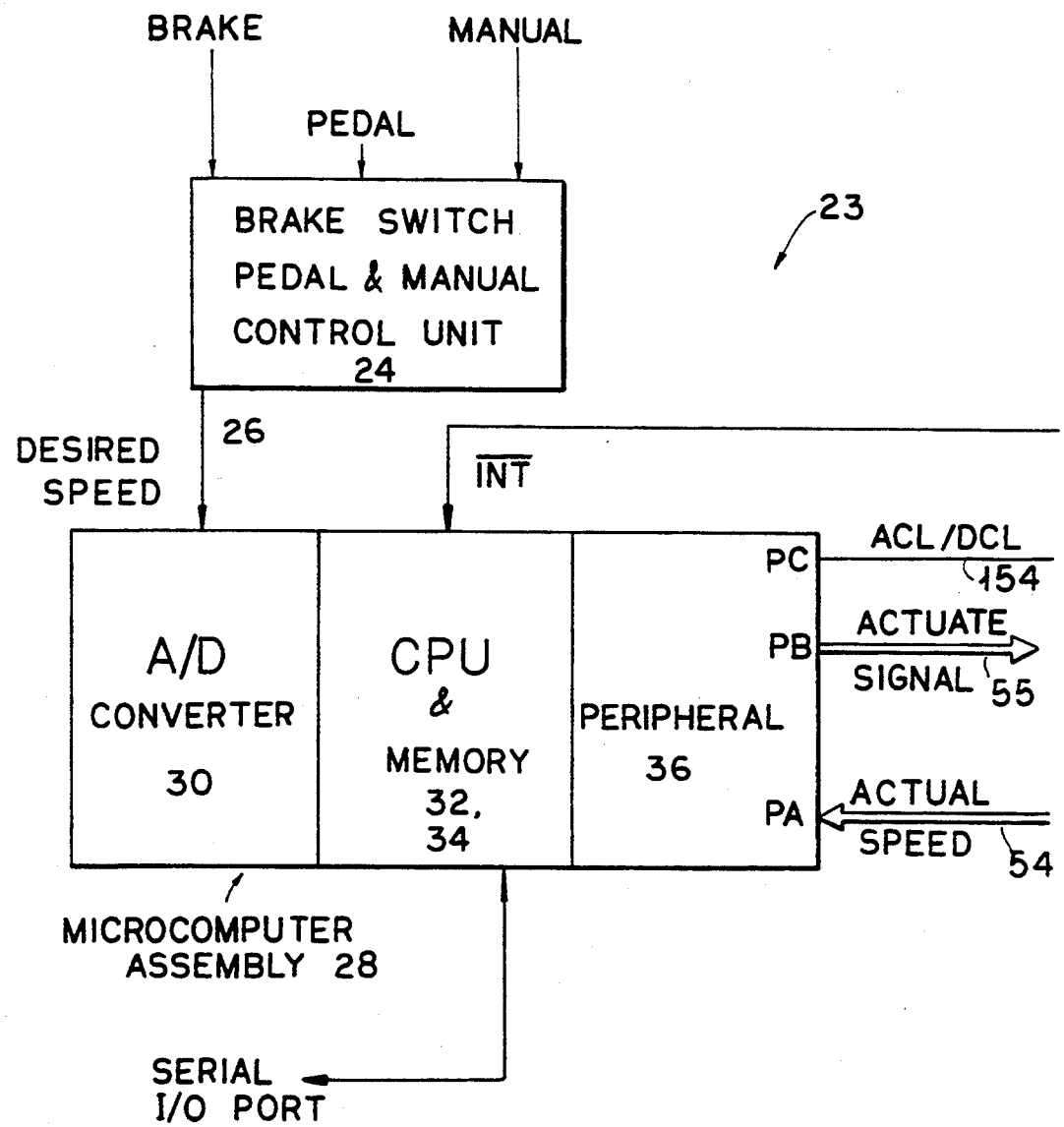
FIGS. 2A and 2B show a block diagram for the drive system.
Figure 2B:
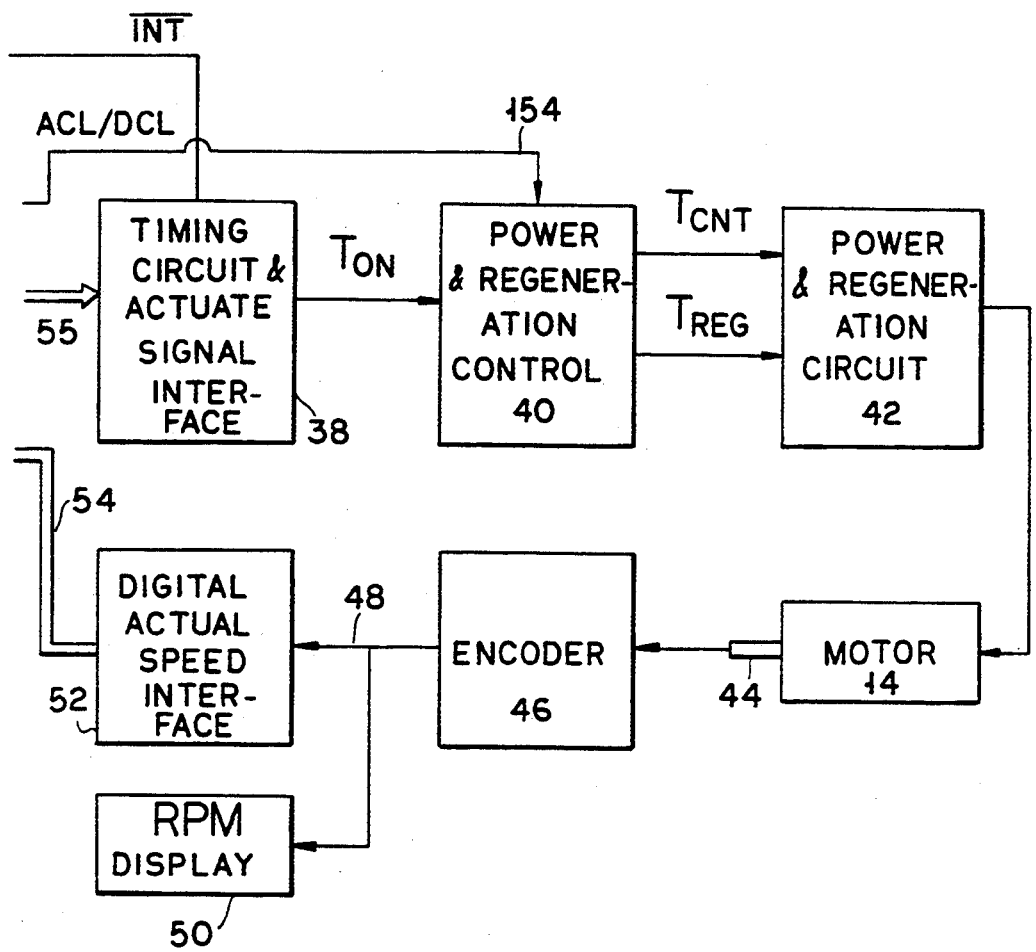

As shown in more detail in FIGS. 2A and 2B, the drive system 23 for the motor vehicle includes a brake switch and control unit 24 which generates a signal indicative of the desired speed or a brake signal on line 26 to microcomputer assembly 28. The microcomputer assembly includes an A/D converter 30, a CPU or microprocessor 32 with an associated memory bank 34, and a peripheral input/output device 36. The system 23 also includes a timing and actuating signal interface circuit 38, a power and regeneration control circuit 40, and a power and regeneration circuit 42. The microcomputer assembly 28 generates two signals (ACL/DCL and an actuation signal) which are processed by circuits 38 and 40 as described below. Circuits 40, 42 cooperate to provide power to motor 14 and to recharge storage battery 18. Motor 14 is preferably a DC motor having a power rating selected to conform to the size of motor vehicle 10. For example for a typical passenger motor vehicle, motor 14 may be a 10 HP 110 VDC series motor.

As previously mentioned motor 14 is coupled to the wheels of the motor vehicle in a well known manner via a driving shaft 44. In addition, an encoder 46 is used to monitor the speed of rotation of the motor shaft 44. This encoder generates a feed back signal on line 48. An RPM display 50 is used to display this speed of rotation. Actual speed interface circuit 52 is used to generate a digital signal on a bus (of 8 lines) 54 for the microcomputer system 28. The ACL/DCL and actuation signals are generated in response to and are dependent on the DESIRED SPEED signal on line 26, and the ACTUAL SPEED signal on bus 54.

Figure 3:
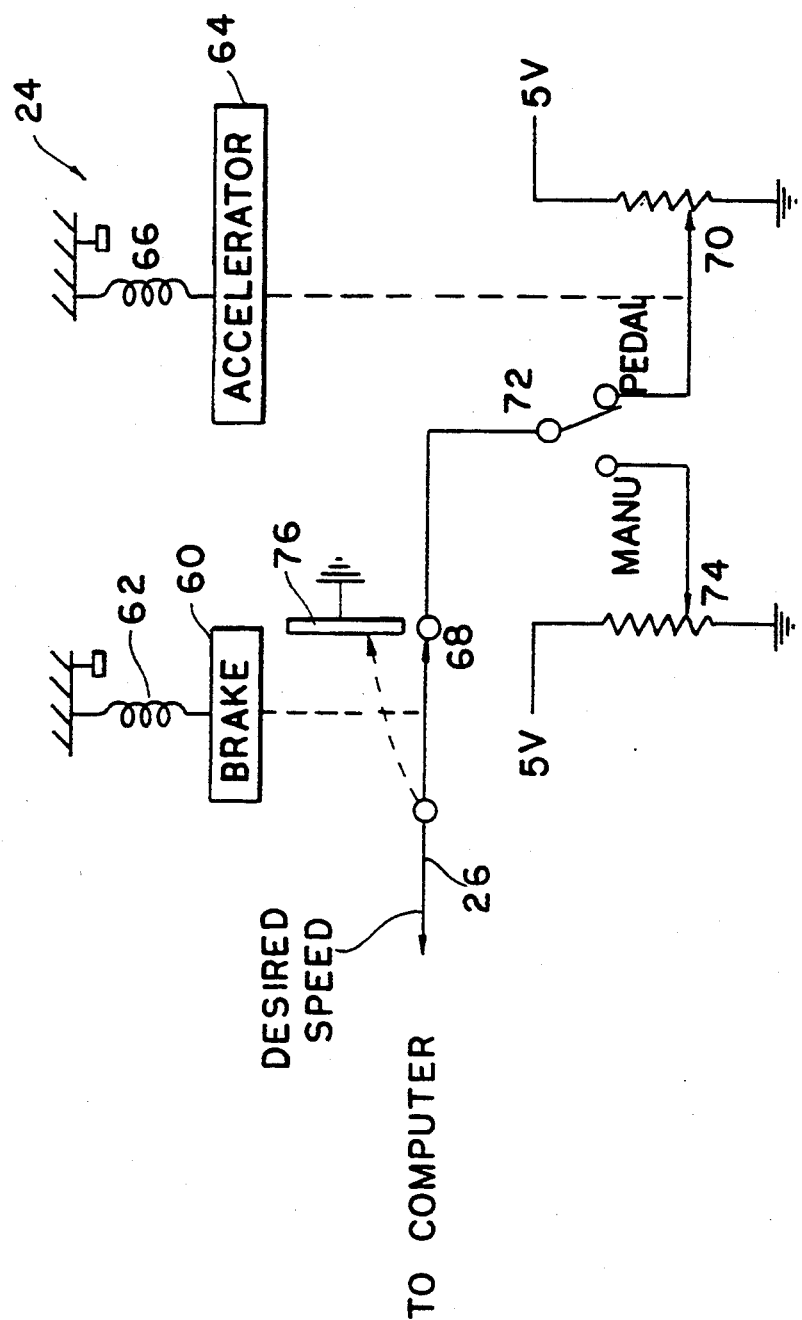
FIG. 3 shows a schematic diagram for the brake and accelerator pedals.

As shown in FIG. 3 the brake switch control unit includes a standard brake pedal 60 biased by a spring 62, and a standard accelerator pedal 64 biased by a spring 66. The brake pedal is also coupled to switch 68. The brake pedal 60 is also coupled to standard hydraulic system which has been omitted for the sake of clarity. The accelerator pedal 64 is coupled to a potentiometer 70. In addition unit 24 includes a manual double pole selector switch 72. In one position (labeled PEDAL) switch 72 connects line 26 to potentiometer 70. In the second position (labeled MANU for manual) the selector switch 72 connects line 26 to a second potentiometer 74. This selector switch 72 is used to control the vehicle 10 either manually by using potentiometer 74, or by using the standard foot-operated accelerator pedal 64.

Unit 24 operates in the following manner. When the brake pedal is in the inactive position, as shown in FIG. 3, line 26 is connected by switch 68 to switch 72. In the first position of switch 72 (shown in FIG. 3) an analog voltage is applied to line 26 by a potentiometer 70. When the accelerator pedal 64 is inactive (as shown in FIG. 3) the potentiometer 70 is set so that it applies a voltage at ground level. When pedal 64 is pressed down, the arm of potentiometer 70 moves up to increase the voltage on line 26. Thus, the signal on line 26 is indicative of the speed desired by the operator. Similarly, when the switch 72 is in the other position, a voltage indicative of the desired speed is applied to line 26 by manually activating potentiometer 74. In other words, the present system allows the motor vehicle 10 to be operated either in a conventional manner via the accelerator pedal 64, or via manually operated potentiometer 74.

When the brake pedal 60 is pressed down, the hydraulic brake system (not shown) is activated to slow down the vehicle in case the electronic brake is not sufficient to stop the vehicle completely Simultaneously pressing the brake pedal 60 causes switch 68 to disconnect line 26 from switch 72 and ground it through ground plate 76. Thus, a ground voltage on line 26 indicates that no current should be applied to the motor.

The signal from line 26 is fed to an A/D converter 30. As shown in more detail in FIG. 4, this converter 30 is preferably an eight channel 10 bit CMOS device with a conversion time of about 100 micro seconds, such as a 7004. The incoming signal on line 26 is fed to terminal strip 78. Strip 78 in turn feeds the signal to converter 30 through the channel 0. Converter 30 then converts the analog signal from line 26 to an eight bit digital word which is sent to the microprocessor over a parallel data bus 82. Converter 30 is further coupled to the microcomputer through a set of control lines 84A used for timing and control signals.

Figure 5A:
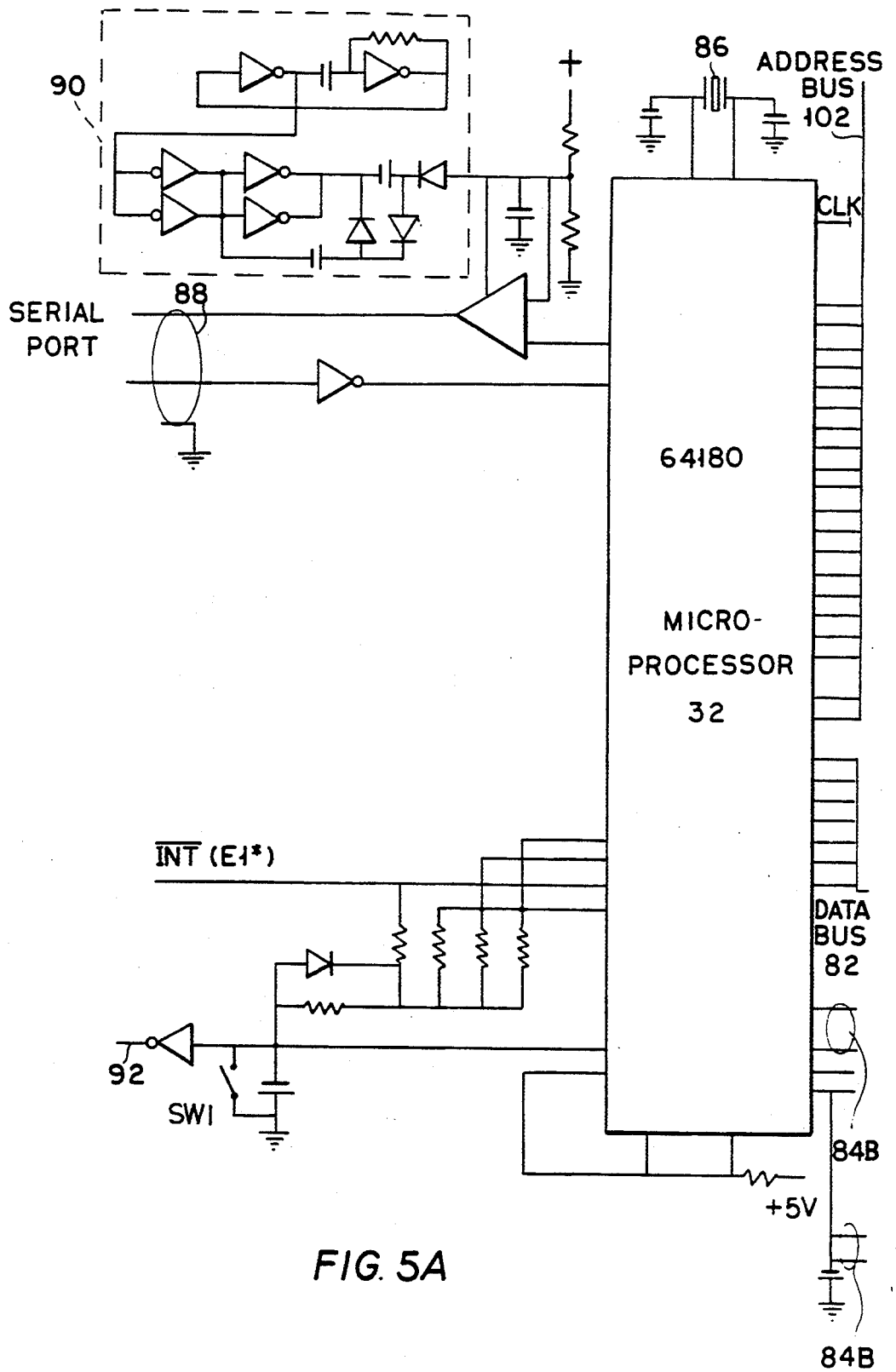
FIGS. 5A and 5B show the microprocessor used in the subject drive system.
Figure 5B:
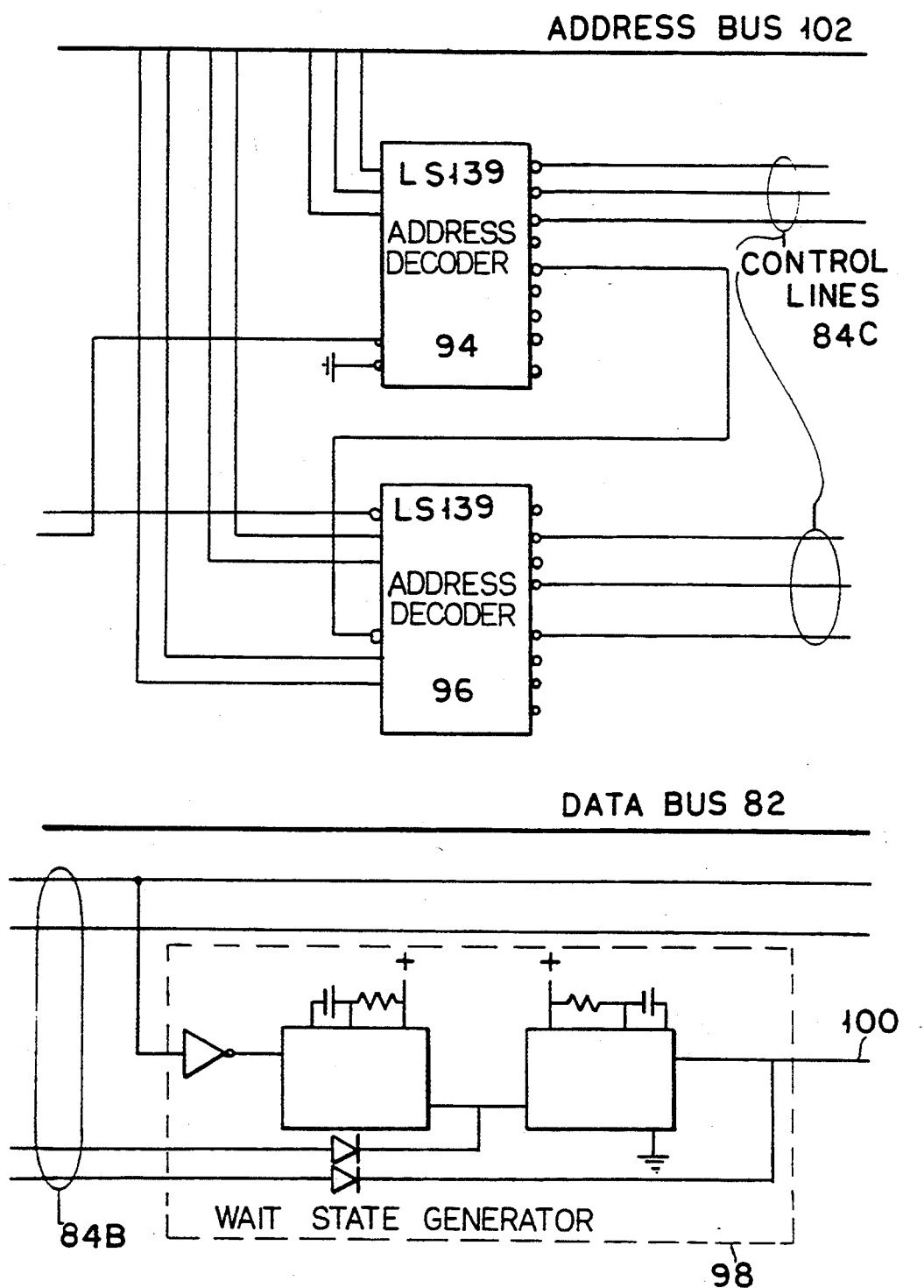

The operation of the system is controlled by a microprocessor 32 shown in more detail in FIGS. 5A and 5B. Preferably, the microprocessor is a single chip device such as a 64180 made by Hitachi. The microprocessor is run at a about 6.144 MHz by using an external crystal 86 which has a resonant frequency of 12,288 MHz. The microprocessor has a serial port connected to lines 88 which in this case are used to program the microprocessor 32. Circuit 90 is provided to supply an RS232 bus with 6 V power. When the system is turned on, a reset signal is required to reset the microprocessor, as well as the peripheral interface. The reset signal may also be generated manually through switch SW-1. Line 92 is used to transmit the reset signal to the peripheral interface. Chips 94 and 96 are provided for address decoding. Circuit 98 is provided to generate wait state, transmitted on line 100 during which address and data are held on buses 102 and 82.

Figure 6:
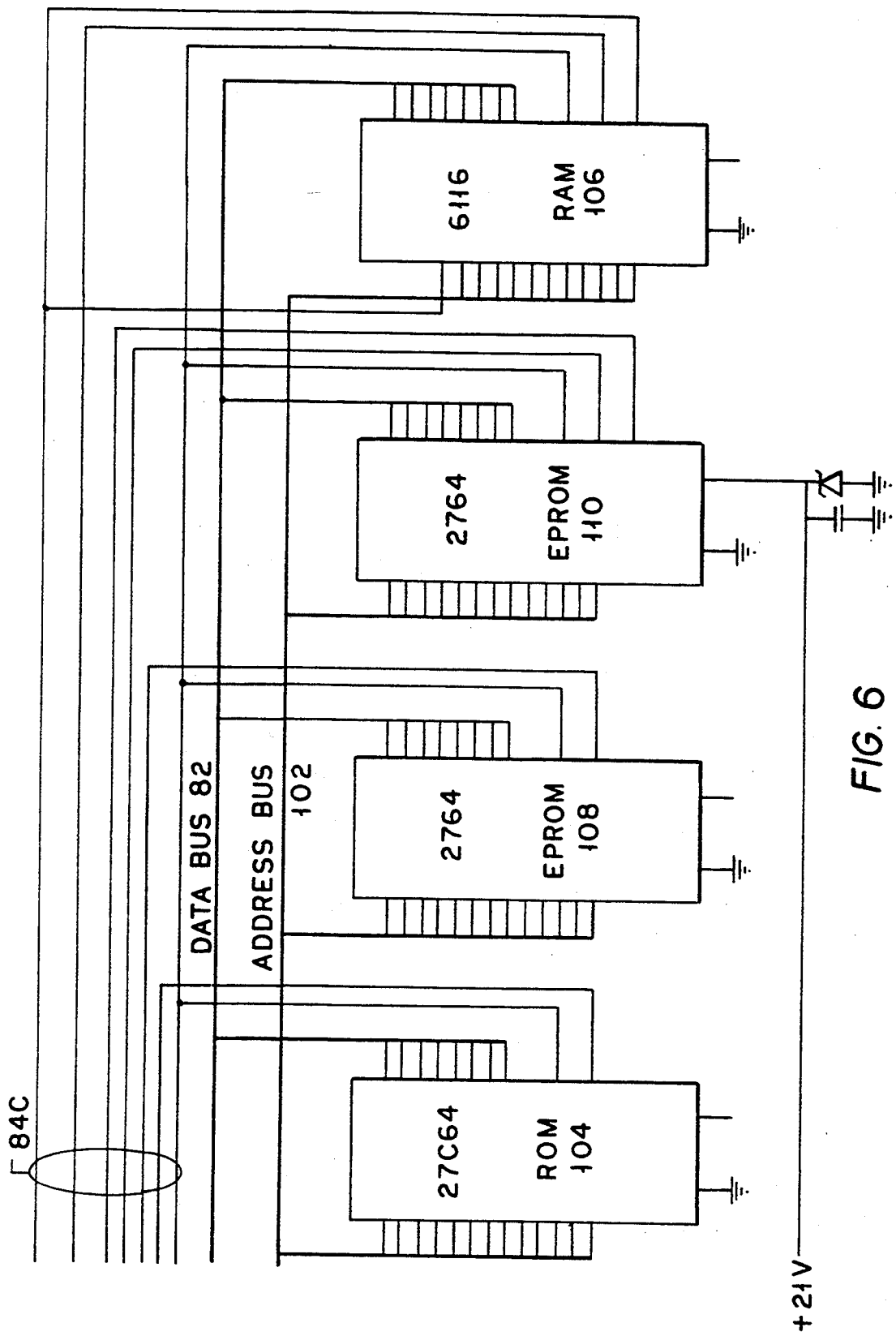
FIG. 6 shows the memories associated with the microprocessor of FIG. 5.

In addition, the microprocessor is connected to data bus 82 as well as an address bus 102. As shown in FIG. 6, buses 82 and 102 as well as control lines 84B and 84C interconnect the microprocessor 32, and A/D converter 30 with memory bank 34. This memory bank includes an 8K ROM 104, a 32K RAM 106 and two 8K EPROM's 108, 110. The ROM 104 contains the preselected programming language, i.e. BASIC. The actual program for the microprocessor 32 may be preloaded into the EPROM 108 or through the serial port as previously mentioned. The RAM 106 is used by the microprocessor during its actual operation. A listing of a BASIC program used to run the microprocessor 32 is attached hereto.

Finally, microprocessor 32 is also connected by data bus 82 and control lines 84D to a peripheral device 36. This peripheral device, which may be, for example, a 8255A IC chip provides a parallel input port A and two parallel output ports B and C. The device 36 is connected by a plurality of parallel lines to a terminal strip 112 which is in turn connected to other external circuits described below. More particularly lines 114 represent the parallel lines for input port A, lines 116 rep-resent the lines for output port B, and lines 118 represent output port C.

Figure 8:
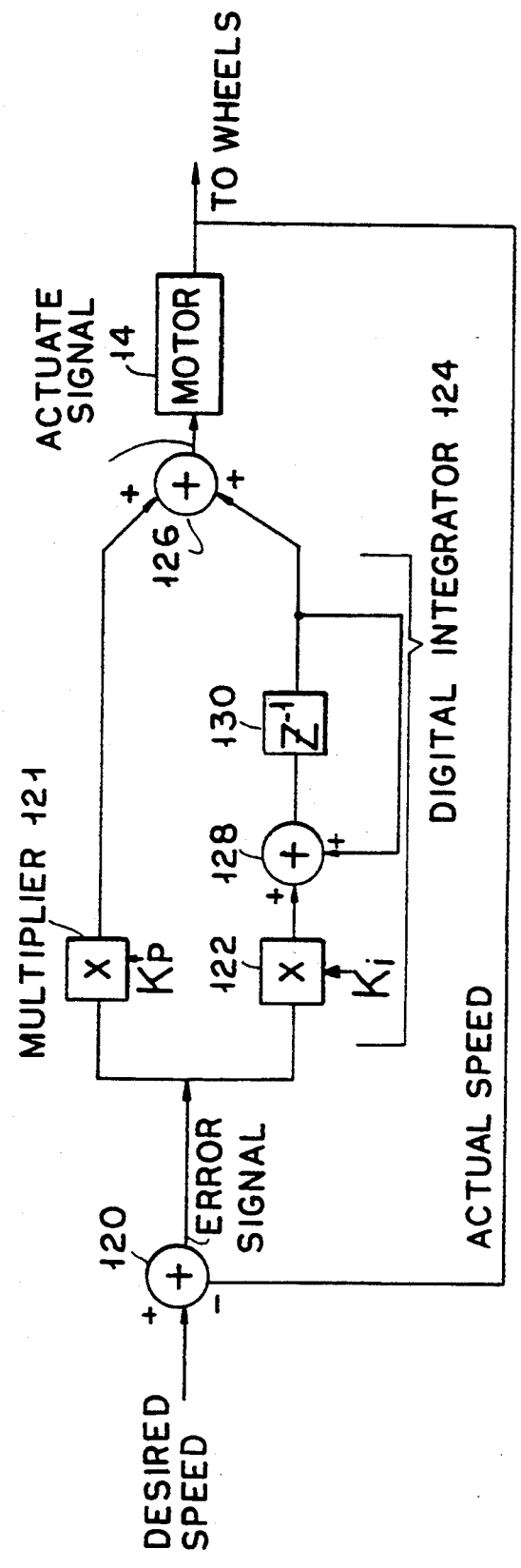
FIG. 8 shows the control loop used for controlling the subject drive system.

Microprocessor 32 is used as PI (proportional and integrator) controller as indicated in the schematic diagram of FIG. 8. In this scheme, the desired speed and actual speed of the motor are compared in adder 120 and the difference (or error signal) is applied simultaneously to a multiplier 121 and an integrator 124. Multiplier 121 multiplies its input by a coefficient of proportionality Kp and feeds the product to an adder 126. Integrator 124, which includes a multiplier 122, adder 128 and Z-1 transformer 130, integrates its input and multiples it with a coefficient of integration Ki. The output of integrator 124 is also fed to adder 126. The sum generated by adder 126 is an actuation signal used to control the motor 14. Due to the integration the final value of the steady state of the error signal is reduced to zero. The actual speed of the motor 14 is monitored and used as a negative feed back to adder 120 as described above. The coefficients Kp and Ki are dependent on the physical characteristics of the motor 14 and motor vehicle 10 and may be determined empirically. For example, Kp may be in the range of 0.5-0.7 and Ki may be in the range of 0.05-0.07.

Figure 9:
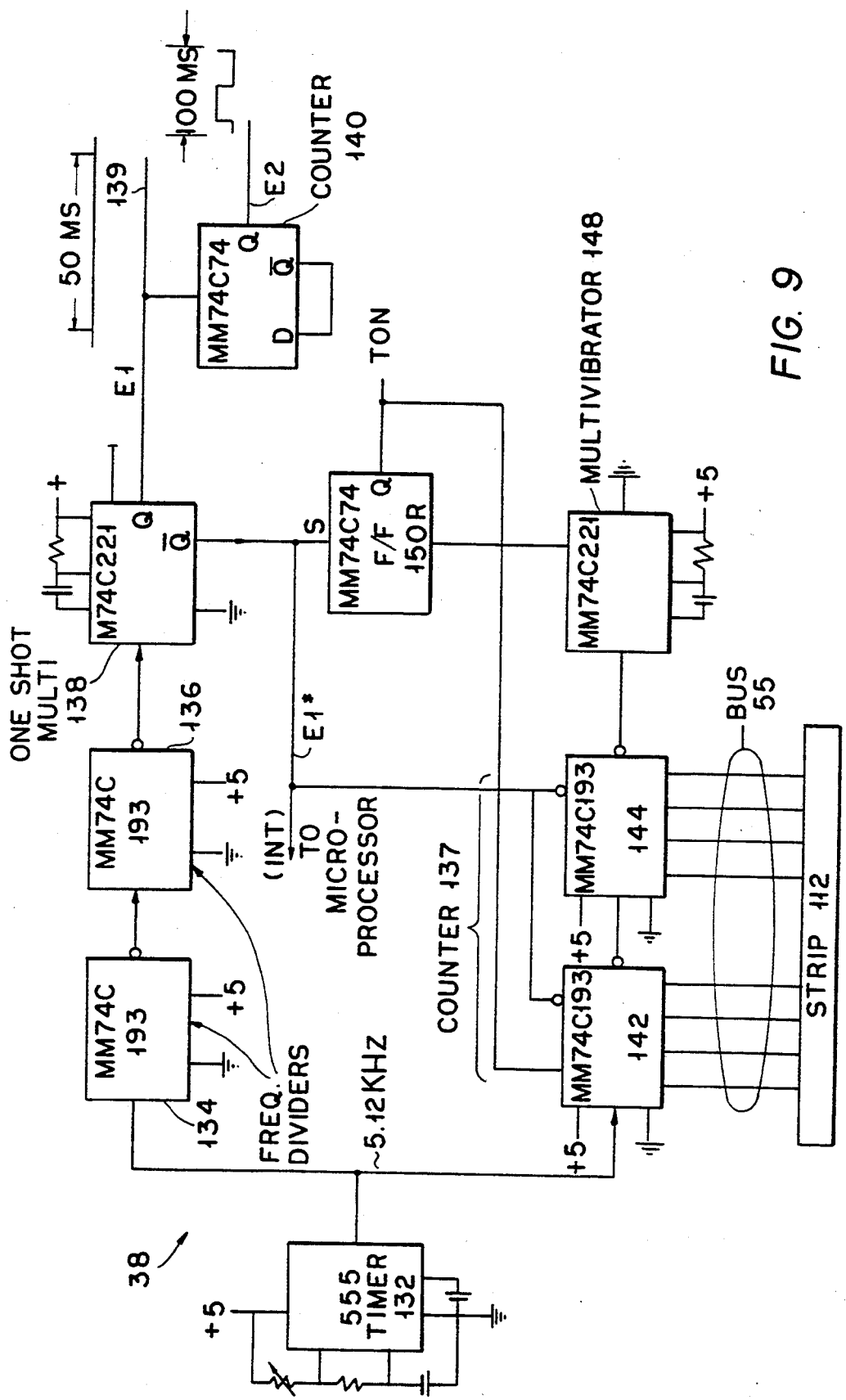
FIG. 9 shows details of the timing and error signal interface circuit of FIG. 2.

The control scheme described above and illustrated schematically in FIG. 8 is implemented as follows. The actuation signal generated by the microprocessor 32 is fed as a multi-bit signal from parallel output port B of I/O device 36 on bus 55 to a timing and actuation signal interface circuit 38. Details of this circuit are shown in FIG. 9. Circuit 38 includes a timer 132 and frequency dividers 134, 136. Timer 132 produces pulses at a preselected frequency of 5.12 KHz. Frequency dividers 134, 136 divide this frequency by 256 and use the resulting pulses to trigger a one-shot multivibrator 138. Multivibrator 138 produces signal E1 on line 139 consisting of pulses having a width of about 1 microsecond, and a period of about 50 milliseconds. Signal E1 is used for timing signals as described below. A counter 140 is also connected to the output of multivibrator 138 to generate a symmetrical signal E2 having a period of 100 milliseconds.

The circuit 38 also includes a counter 137 consisting of 74C193 IC chips 142 and 144 which uses the output of timer 132 as a clock signal. The counter has eight parallel input lines of bus 55 connected to terminal strip 112 to receive an input from port B of peripheral 36. Signal E1* (the inverse of E1) is used to load the actuation signal received from port B into the counter 137. Thereafter, counter 137 counts down until its contents reach zero. At this point counter 137 sends a signal to trigger a multivibrator 148. The output of the multivibrator is connected to the reset pin of a flip-flop 150. The set pin of flip-flop 150 is connected to signal E1*. Therefore flip-flop 150 produces a signal TON which has the same period and is synchronous with signal E1 with a duty cycle proportional to the actuation signal from the microprocessor 32.

Signal E1* is also sent back to microprocessor 32 via terminal strip 112 (See FIGS. 7 and 5) to serve as an interrupt signal INT. Whenever this signal goes low, the microprocessor 32 samples its inputs and starts the computations required to generate the output signals described.

Figure 7:
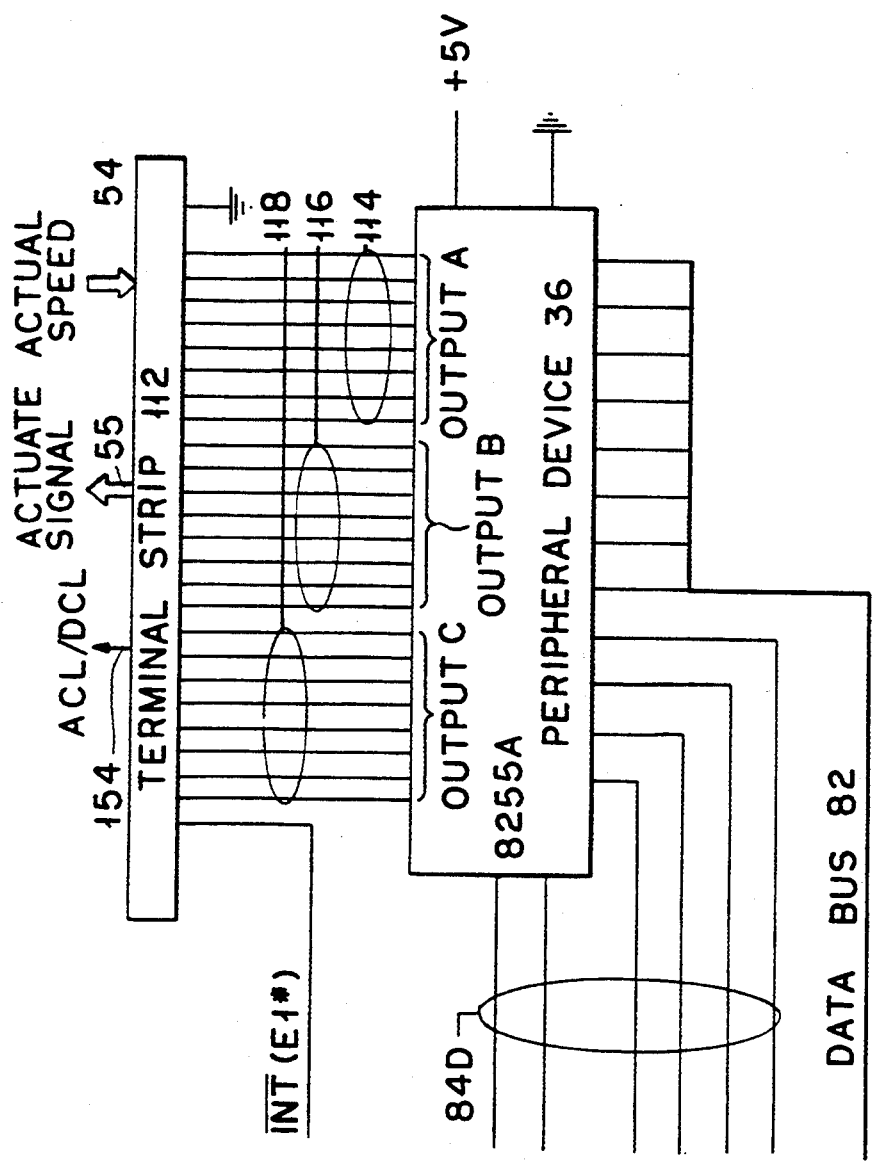
FIG. 7 shows a peripheral input/output device for the microprocessor of FIG. 5.
Figure 10:
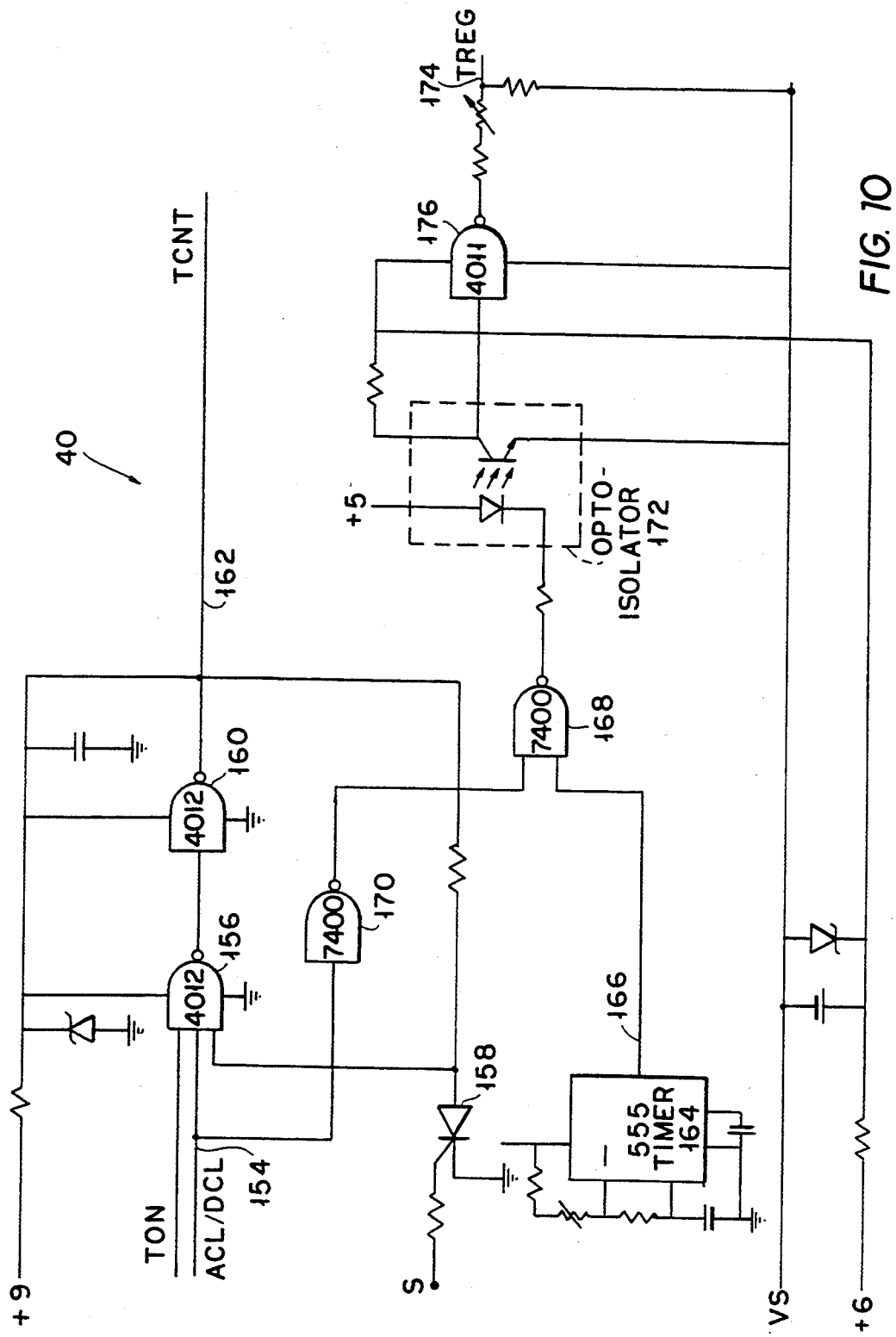
FIG. 10 shows details of the power and regeneration control circuit of FIG. 2.

Microprocessor 32 also generates a binary signal on line 154 indicated in the drawings as ACL/DCL (See FIG. 7). In effect, signal ACL/DCL designates two modes for the system: a so-called actuation mode wherein the vehicle is accelerating or is coasting (i.e. ACL/DCL is high), and a deceleration mode in which the vehicle either decelerates, or is coasting (and ACL/DCL is low). As shown in FIG. 10, the signals TON and ACL/DCL are fed to a NAND gate 156. This NAND gate 156 has also an input connected to a protective circuit including an SCR 158. Normally, SCR 158 is off and its output pin is high. The output of NAND gate 156 is fed to an invertor 160 to generate a signal TCNT on line 162. Signal TCNT turns on the power to the motor as described below. If the motor current exceeds 275A, SCR 158 turns on and inhibits signal TCNT.

The circuit shown in FIG. 10 also includes a timer 164 which generates a timing signal on line 166 which preferably has a period of about 5 milliseconds and is on for about 4.25 milliseconds per period. The timing signal on line 166 is fed to a NAND gate 168. The other input of NAND gate 168 is connected through an invertor 170 to signal ACL/DCL as shown. The output of NAND gate 168 is used to drive the input of an opto-isolator 172. The output of the opto-isolator 172 is used in turn to generate a signal TREG on line 174 through an invertor 176. To insure isolation between the input and output stages of isolator 172, its output stage is powered by a 6 VDC separate power supply which consists of four AA batteries connected in series. It is clear from the above description of the circuit of FIG. 10 that when the subject drive system is in the actuation mode and the actual motor speed is lower than the speed requested by the accelerator pedal, the signal TCNT consists of a train of pulses having a period of 50 milliseconds and having a duty cycle proportional to the ACCELERATION signal. When the desired speed is reached, i.e. the acceleration signal is zero, or in the deceleration mode, line 162 is low. On the other hand, the signal TREG on line 174 consists of a train of pulses identical to the train produced by timer 164 when drive system is in the deceleration mode. At other times, this signal is low. The timing signals are illustrated schematically in FIG. 11.

Figure 12:
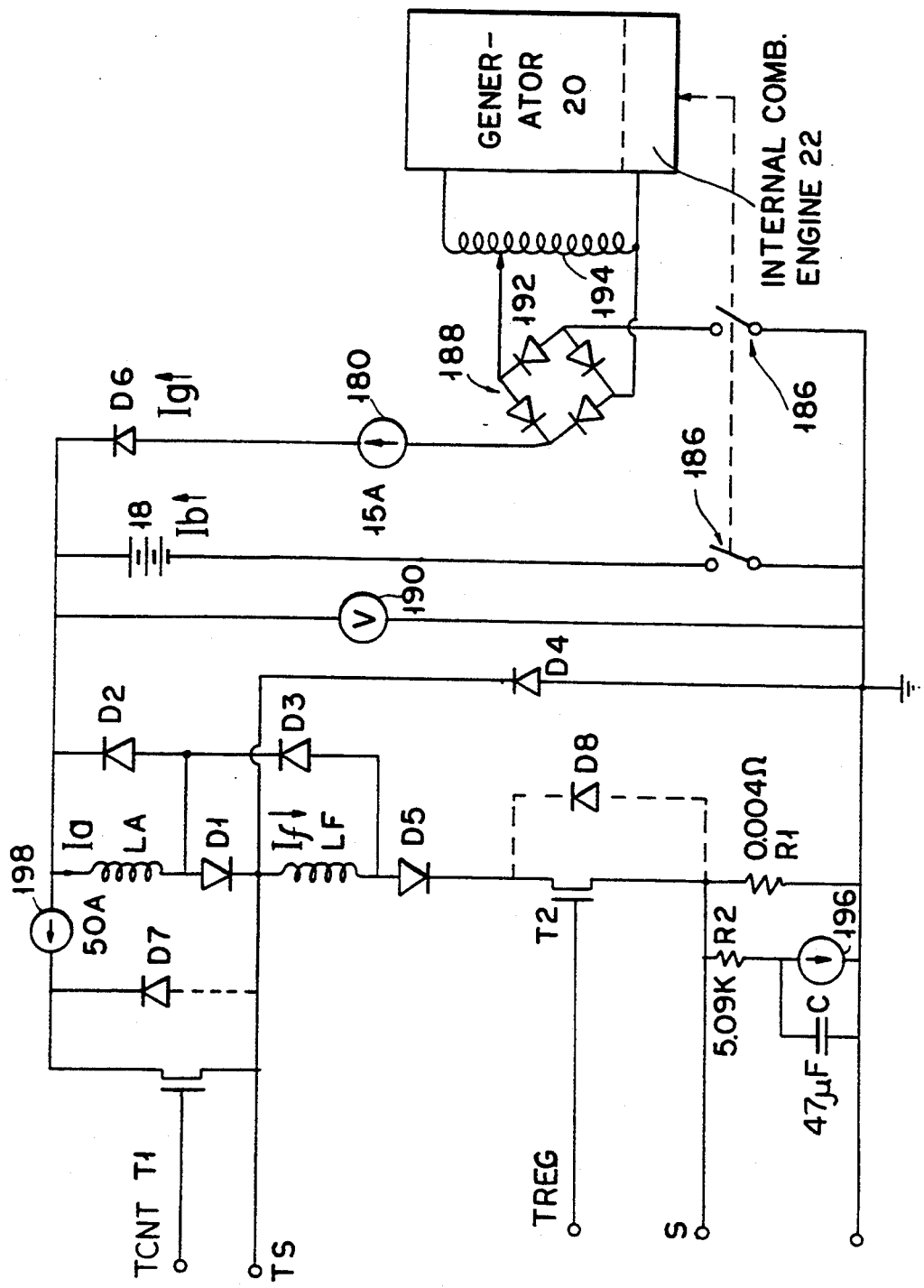
FIG. 12 shows schematically the power and regeneration circuit.

The power and regeneration circuit is shown in FIG. 12 with motor 14 being represented as having an armature coil LA and a field coil LF. Power to the motor is provided by rechargeable storage battery 18 and/or generator 20. Preferably, battery 18 is a commercially available lead-acid-type battery rated at 108 volts and 60 amp-hours. Generator 20 is rated at 2200 watts/120, and it includes an internal combustion engine 22.

The operation of the motor is controlled by two power FET's T1 and T2. These FET's are turned on and off by the signals TREG and TCNT as discussed more fully below. Preferably FET's are MOSFET's such as JS225010 made by Powerex. As mentioned above, motor 14 is preferably a DC motor. This type of motor cannot operate without a residual magnetic flux in the motor. When the circuit is initially turned on, starting the initial magnetic flux thorough the motor coils LA, LF is generated by the actuating current. In addition, diodes are provided to insure that the current, If, through the motor field coil is always flowing in the same direction indicated in FIG. 12.

The vehicle 10 is started by closing a double pole switch 186. One pole is used for battery 18 while the second pole is used for the generator (including the internal combustion engine 22). Generator 20 stays on and operates in a constant mode with a constant output independently of the operation of the circuit in FIG. 12. Hence, its engine 22 can be tuned so that it operates efficiently at its rated output whereby, it uses a minimal amount of fuel and produces a minimal amount of pollutants.

Initially, transistors T1 and T2 are off so that there is no load on the circuits, and therefore, generator 20 is charging battery 18 through a rectifier bridge 188 and diode D6. The current from generator 20 is monitored through an ammeter 180, while the voltage across battery 18 is monitored by a voltmeter 190. When the accelerator pedal is depressed indicating a request for acceleration, signal TCNT goes high turning transistor T1 on. Transistor T2 remains off. The equivalent circuit for this state is shown in FIG. 13. When transistor T1 turns on, current is fed to the armature coil and field coil through diodes D1, D5, T1 and resistor R1. Normally, battery 18 is charged continuously, so that its internal impedance is low, and the current Ia and, thus If, are substantially equal to Ib plus Ig. As long as there is a demand for actuating the vehicle, (i.e. the ACL/DCL signal from the microprocessor 32 is high) signal TCNT is periodic with its duty cycle being proportional to the actuation signal, as described above. During the actuation mode, the average current from the battery and generator is positive and power is applied to the DC motor thereby powering the vehicle.

Figure 11:
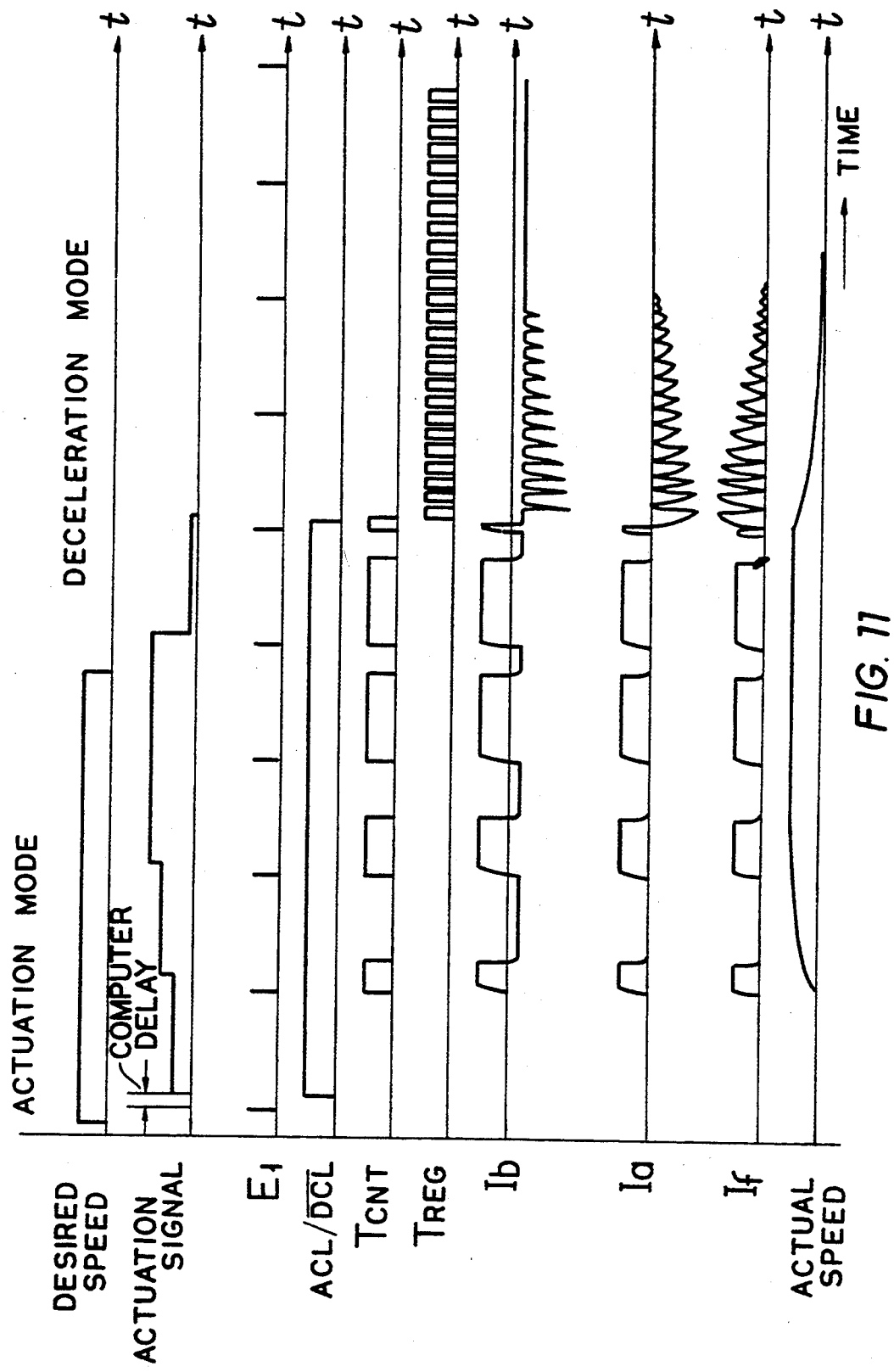
FIG. 11 shows various signals produced through the system.

When TCNT goes low, transistor T1 turns off and the residual current recirculates through LA, D1, LF, D3 and D2. Meanwhile, the generator 20 is charging the battery 18, as shown in the equivalent circuit of FIG. 14. The current Ib flowing through the battery during this time is therefore negative, as shown in FIG. 11. Importantly, the output of generator 20 may be varied so that its voltage VA tracks the amplitude of the actuation signal for example by changing the position of arm 192 on generator coil 194. Therefore, for an increased actuation signal resulting in a longer period of discharge of Ib, the output of the generator may be increased thereby resulting in an increased charging current Ib. More specifically, voltage VA can be changed so that the area A above the horizontal axis, as shown for Ib in FIG. 11, is equal to area B below the axis. Under these conditions, while running at low speed, the over-all charge level of the battery remains constant, and hence no recharging will be necessary even without the regenerating cycle discussed below.

When the system is switched to a brake mode, signal ACL/DCL goes low as shown in FIG. 11. This causes the signal TCNT to go low turning transistor T1 off. Meanwhile signal TREG goes high turning transistor T2 on. The resulting equivalent circuit is shown in FIG. 15. The battery 18 and the generator 20 are cut off by T1 so that the generator recharges the battery as before. Meanwhile, since the motor keeps turning, and in the presence of residual magnetic flux in the field, it produces a circulating current Ia due to EMF which rises exponentially in the reverse direction. In this mode, the motor acts as a dynamic brake converting some of the kinetic energy of the vehicle into electrical energy. It has been found that regeneration does not occur unless the motor turns at least 400 RPM. The final value of this current is determined by the length of time the transistor T2 remains turned on.

As mentioned before, and as shown in FIG. 11, signal TREG is periodic. When it goes low, it turns transistor T2 off. The resulting equivalent circuit is shown in FIG. 16. In this configuration, the current Ia through the motor coils LA and LF cannot change instantaneously. Moreover this current is blocked from flowing to the generator by diode D6. Therefore, current Ia is discharged into the battery 18. Since this is very low resistance path, the current discharges very fast, so that it appears as a spike. The current from the armature is superimposed on the charging current through the battery from the alternator resulting in the wave shape Ib shown in FIG. 11. Thus the electrical energy generated by motor 14 is stored in the battery. When transistor T2 is turned on, the whole cycle is repeated. As described above, in the braking mode transistor T2 is turned off about 15% of the time. The EMF produced by the motor is typically about half the voltage of the battery 18, and about 30% of the regeneration power is fed back to the battery.

As shown in FIG. 11, in the actuation mode the current Ia is equal to current If in phase and magnitude. In the brake mode, If still has the same magnitude as Ia but, Ia flows in the opposite direction from the actuation mode.

Importantly, as shown in FIG. 11, regeneration takes place even if the motor $Em_f$ is lower than the battery voltage.

Referring back to FIGS. 12 and 13, in the actuation mode, when transistor T1 is on, the current Ia through T1 also passes through a current monitoring resistor R1 having a value of about 0.004 ohms. Thus the voltage at node S is proportional to the current through the transistor T1 and the motor armatures. At the selected value of R when this current is equal to about 275 amps, the voltage at node is about 1.1 volts. As shown in FIG. 10, node S is used to control the gate of SCR 158. When this voltage reaches 1.1 volts, gate 158 turns on changing the signal TCNT to low through NAND gates 156, 160. Signal TCNT then turns off transistor T1. Thus resistor R1 and SCR 158 cooperate to provide current protection for the system. The voltage at node S is also filtered by a low pass filter formed of a resistor R2 and a capacitor C as shown. The average current through the motor during the actuation mode is monitored on an ammeter 196 hooked in parallel with capacitor C. During the brake mode, the current through the motor is monitored by an ammeter 198 in series with transistor T2.

Diodes D7 and D8 in FIG. 12 internal to transistors T1 and T2 and are provided to protect the MOSFET's.

Figure 17:
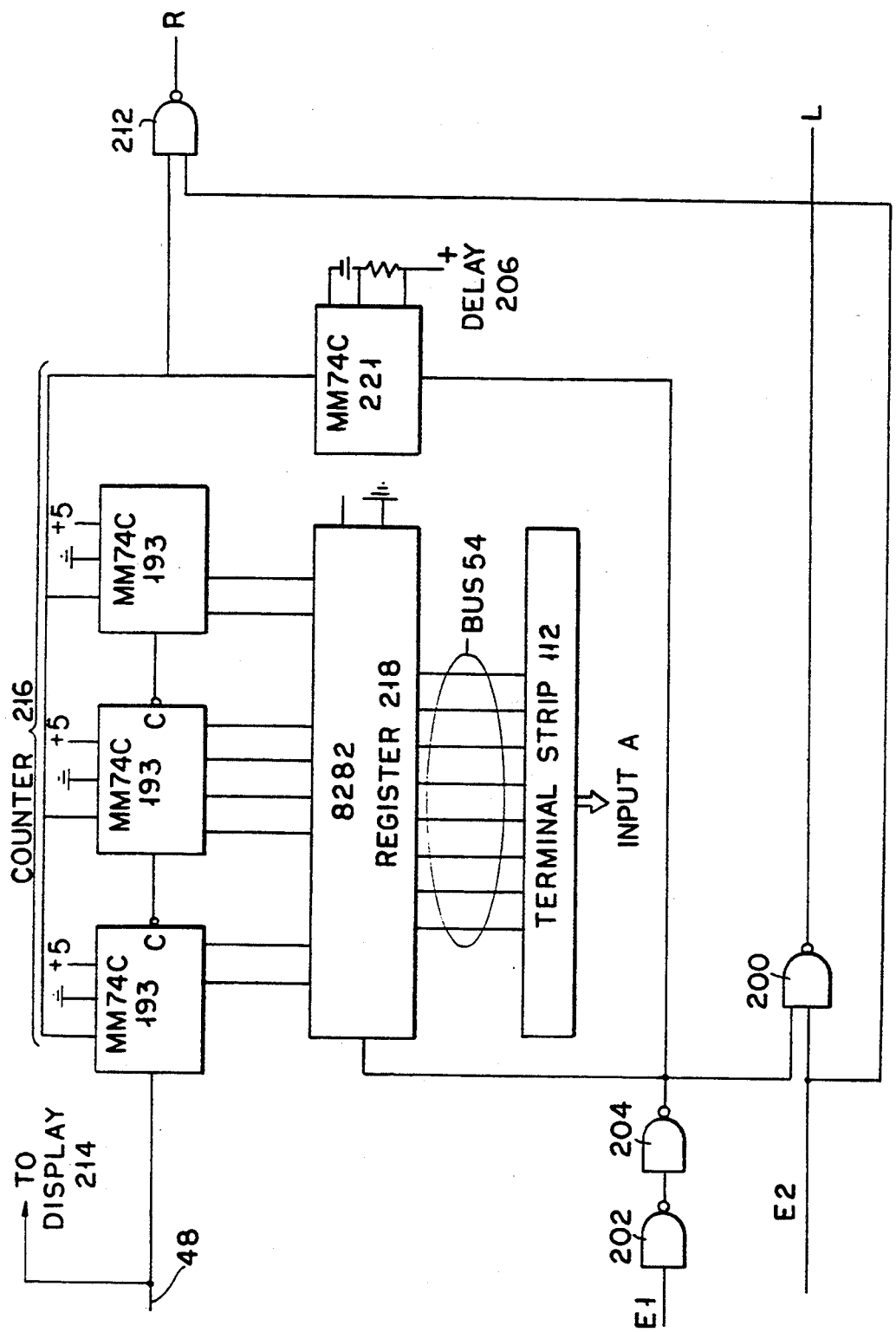
FIG. 17 shown details of the digital actual speed interface circuit of FIG. 2.

As shown in FIG. 2, the rotation of motor 14 is monitored by an encoder 46. Encoder 46 generates a preselected number of pulses for each revolution of the motor. As shown in FIG. 17, the output 48 from encoder 46 is fed to a three stage counter 216. This counter counts and scales the number of pulses from the encoder and feeds them to a parallel in/parallel out register 218. The output of register 218 is fed over the parallel lines of bus 54 to input port A of interface 36 via terminal strip 112 as shown. Signal E1, buffered by two invertor gates 202, 204 and a delay element 206 is used to reset counter 216.

Figure 18:
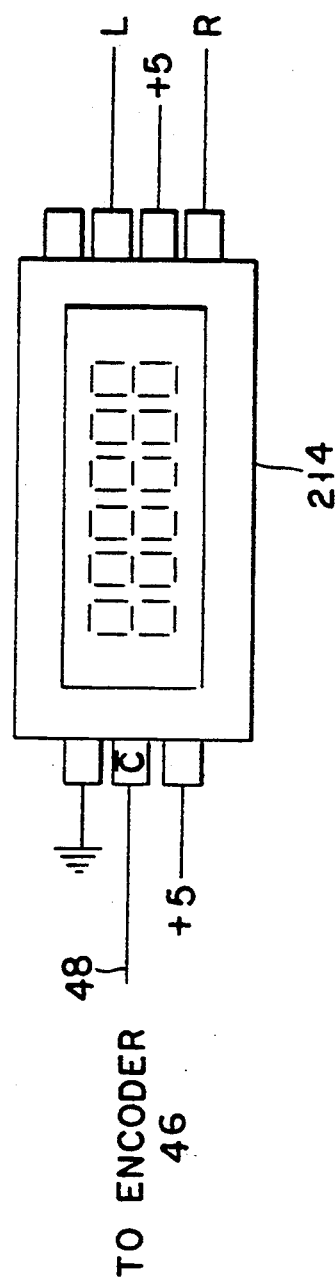
FIG. 18 shows a digital display used to show the speed of rotation of the motor.

NAND gates 208 and 212 are used to generate signals R and L. These signals are used, as shown in FIG. 18 to enable a digital display 214. Display is also connected to output 48 of encoder 46 to show the speed of rotation of motor 14.

Obviously numerous modifications may be made to this invention without departing from its scope as defined in the appended claims.

We Claim:

1. A hybrid drive system for a motor vehicle comprising:
   a. a storage battery for generating a battery current;
   b. a dc electric motor receiving said battery current for applying primary motive power from said storage battery to said motor vehicle during an actuation mode, said electric motor converting the kinetic energy of said motor vehicle into electrical energy by dynamically generating a regenerative charging current during a braking mode;
   c. switching means for selectively applying said battery current to said motor, and for selectively applying said regenerative charging current to said storage battery; and
   d. electronic control means coupled to said switching means for directing said battery current from said storage battery to said vehicle in said actuation mode for moving said motor vehicle, and in said braking mode for applying dynamic braking to said motor vehicle; wherein in said braking mode said control means applies a repetitive control signal to said switching means, said repetitive control signal alternating between a first value for a first period and a second value for a second period, wherein said regenerative charging current is repetitively built up during said first period during which said motor is isolated from said storage battery, said regenerative charging current being discharged through said storage battery during said second period thereby charging said storage battery.

2. The hybrid drive system of claim 1 wherein said storage battery has a battery voltage applied to said motor in said actuation mode, and during said first period said motor generates a motor emf lower than said battery voltage.

3. The hybrid drive system of claim 1 wherein said control means includes a first control circuit including speed request means for setting a requested speed, comparator means for comparing the actual speed of said motor vehicle and said requested speed, said first control means generating a first control signal related to the difference between said requested speed and the actual speed.

4. The hybrid drive system of claim 3 wherein said control means includes a second control circuit for generating said repetitive control signal during said braking mode.

5. The hybrid drive system of claim 1 further comprising separate battery charging means generating a separate charging current for charging said storage battery, said separate battery charging means generating a constant output independent of the operation of said motor.

6. The hybrid drive system of claim 5 wherein said separate battery charging means includes a generator and an internal combustion engine driving said generator.

7. The hybrid drive system of claim 5 wherein said semiconductor switching means includes a first electronic switch actuated by a first control signal, and a second electronic switch actuated by a second control signal.

8. The hybrid drive system of claim 7 wherein said motor is a dc motor with a dc field coil and a dc armature coil and said electronic switching means includes steering diodes.

9. The hybrid drive system of claim 8 wherein said first control signal is first pulsed signal having a pulse width proportional the difference between the actual speed of the motor vehicle and a requested speed.

10. The hybrid drive system of claim 8 wherein said second controlled signal is a second pulse signal having a constant pulse width defining said first and second time periods.

11. The hybrid drive system of claim 8 wherein said electronic switching means includes diodes cooperating with said first electronic switch to operate in a first actuating mode during which current flows from said power source to said motor, and a second actuating mode in which current recirculates through said dc armature coil and dc field coil.

12. A hybrid drive system for a motor vehicle comprising:

a. a dc electric motor for applying motive power to said motor vehicle, said motor having an armature coil and a field coil;
b. a storage battery for supplying a drive current to said electric motor;
c. semiconductor switching means for selectively applying said drive current to said motor, said switching means including current steering means for applying current through said field coil in a single direction during an actuation mode and a dynamic braking mode; and
d. control means coupled to said switching means for operating said motor in said actuation mode for moving said motor vehicle, and said dynamic braking mode for applying dynamic braking to said motor vehicle, wherein in said dynamic braking mode said semiconductor switching means periodically isolates said motor from said battery for a first time period to build up a regenerative charging current, and drive said regenerative charging current through said battery during a second time period.

13. The hybrid drive system of claim 12 wherein said power source includes generator means disposed in parallel to said storage battery means.

14. The hybrid drive system of claim 13 wherein said generator means is constructed and arranged to generate a constant dc current.

15. The hybrid drive system of claim 14 wherein said generator means includes an internal combustion engine.

16. The hybrid drive system of claim 12 further comprising monitoring means for monitoring the current flowing through said motor in said actuating mode, said monitoring means inhibiting said first control signal if said motor current exceeds a limit.

17. The hybrid drive system of claim 16 wherein said control means comprises a microprocessor coupled to said accelerator means and brake means.

18. The hybrid drive system of claim 17 wherein said requested speed signal and said brake signal are analog signals, and wherein said control means includes analog-to-digital converting means for converting said analog signals to said microprocessor.

19. The hybrid drive system of claim 12 further comprising accelerator means for generating a requested speed signal, and brake means for generating a brake request, said brake means being arranged to inhibit said accelerator request signal when said brake means is activated.

20. The hybrid drive system of claim 12 wherein said storage battery has two battery terminals and said armature coil and field coil are connected in series forming a branch parallel to said battery terminals.

21. The hybrid drive system of claim 20 wherein said switching means includes a first semiconductor switch connected in parallel with said armature coil and a second semiconductor switch in series with said armature and field coils said first semiconductor switch being opened and closed by said control means during said brake mode, and said second switch being selectively activated during said actuation mode.

22. The hybrid drive system of claim 21 wherein said semiconductor switches consists of power FETs.

* * * * *